United States Patent [19]

Toshinai et al.

[11] 4,064,066
[45] * Dec. 20, 1977

[54] PHOSPHORS FOR INFRARED-TO-VISIBLE CONVERSION

[76] Inventors: Akio Toshinai, No. 5-205, 4-chome, Tsurugadai, Chigasaki, Kanagawa; Takashi Hase, No. 20-41, Dai, Kamakura, Kanagawa, both of Japan

[*] Notice: The portion of the term of this patent subsequent to Jan. 15, 1991, has been disclaimed.

[21] Appl. No.: 719,693

[22] Filed: Sept. 2, 1976

Related U.S. Application Data

[63] Continuation of Ser. No. 581,924, May 29, 1975, abandoned, which is a continuation-in-part of Ser. No. 409,301, Oct. 24, 1973, abandoned, which is a continuation-in-part of Ser. No. 209,750, Dec. 20, 1971, Pat. No. 3,785,991.

[30] Foreign Application Priority Data

Dec. 21, 1970  Japan .................................. 45-114907
June 8, 1971  Japan .................................. 46-40356

[51] Int. Cl.² ............................................ C09K 11/46
[52] U.S. Cl. ...................... 252/301.6 R; 252/301.4 H
[58] Field of Search ................. 252/301.4 H, 301.6 R

[56] References Cited

U.S. PATENT DOCUMENTS

| | | | |
|---|---|---|---|
| 2,806,002 | 9/1957 | Smith | 252/301.6 R |
| 3,541,018 | 11/1970 | Hewes et al. | 252/301.4 H |
| 3,667,921 | 6/1972 | Grodkiewicz et al. | 252/301.4 H |
| 3,785,991 | 1/1974 | Toshinai et al. | 252/301.4 H |

*Primary Examiner*—Jack Cooper

[57] ABSTRACT

A phosphor for infrared-to-visible conversion comprising a complex rare earth fluoride as a main ingredient and zinc fluoride having a general composition expressed by one of the following formulas:

$$(Y_{1-x-y}Yb_xA_y) F_3 \cdot \alpha ZnF_2$$

$$(La_{1-x-y}Yb_xA_y) F_3 \cdot \alpha ZnF_2 \text{ and}$$

$$(Lu_{1-x-y}Yb_xA_y) F_3 \cdot \alpha ZnF_2$$

wherein $x$ is in the range of from 0.05 to 0.5, $y$ is in the range of from 0.002 to 0.09 when yttrium fluoride is the host material and from 0.001 to 0.1 when lanthanum or lutetium fluoride is the host material, $\alpha$ is in the range of from $1.6 \times 10^{-4}$ to $1.6 \times 10^{-3}$ grams with respect to 1 gram of the phosphor and A is at least one member selected from Er and Ho.

8 Claims, 9 Drawing Figures

PHOSPHORS FOR INFRARED-TO-VISIBLE CONVERSION

CROSS REFERENCE TO RELATED APPLICATIONS

This is a continuation of application Ser. No. 581,924 filed May 29, 1975, now abandoned which was a continuation-in-part application of Ser. No. 409,301, filed Oct. 24, 1973 now abandoned which was a continuation-in-part application of Ser. No. 209,750, filed Dec. 20, 1971, now U.S. Pat. No. 3,785,991 issued Jan. 15, 1974.

BACKGROUND OF THE INVENTION

1. Field of the Invention

This invention relates to a phosphor which exhibits a visible emission under excitation of infrared radiation.

2. Description of the Prior Art

It has recently been found that some phosphors comprising as a host material a rare earth fluoride such a yttrium fluoride, lanthanum fluoride, and lutetium fluoride as an activator, a rare earth ion such as erbium ($Er^{3+}$) for forming the luminescence center and as a sensitizer an ytteribium ion ($Yb^{3+}$), exhibit a line emission throughout the visible region such as green, red or blue emission due to the trivalent rare earth ion acting as the activator under excitation of infrared radiation from GaAs infrared emitting diodes and the like.

In addition to the above-mentioned yttrium fluoride, lanthanum fluoride and lutetium fluoride, barium yttrium fluoride is known as the host material effective as an element for infrared-to-visible conversion. Phosphors having these fluorides as the host material exhibit considerable luminescence efficiency under excitation of infrared radiation, but because of insufficiency in luminescence brightness, their positive application to various solid state light emitting display devices such as a character display or multicolor display device has been hindered.

Particularly instructive references are included in the following patent and publication:

a. U.S. Pat. No. 3,541,018 patented on Nov. 17, 1970 R. A. Hewes. This patent discloses an infrared-excitable ytterbium-sensitized erbium- or thulium-activated rare earth fluoride luminescent material. Although the phosphors of this invention are similar to the luminescent material of the patent with respect to the intended functions, but, the electronic process in solid on the excitation-to-emission mechanism is substantially improved by changing the compositions over the material of said patent, whereby the luminescence efficiency is extremely heightened.

b. Mat. Res. Bull, vol. 4, page 777 (1969), L. G. Van Uitert et al.

This publication teaches that an addition of beryllium fluoride is effective to some extend in the preparation of phosphors. However, because of deliquescence and toxicity of such additive it is impractical for the preparation of phosphors. The product of this invention has no such disadvantage at all, but gives a higher luminescence efficiency.

BRIEF DESCRIPTION OF THE DRAWINGS

FIGS. 7-A, 7-B and 7-C illustrate the effects of this invention in terms of the time response characteristics under excitation of pulselike infrared radiation with respect to the phosphors comprising as the host material yttrium fluoride, lanthanum fluoride or lutetium fluoride. The curve $c$ illustrates the response of the phosphor incorporated with zinc fluoride according to this invention, and the curve $d$ illustrates the response of the phosphor free of zinc fluoride, each curve being normalized based on the saturation value of each luminescence brightness.

DETAILED DESCRIPTION OF THE INVENTION

This invention relates to a novel phosphor for infrared-to-visible conversion. More specifically, this invention relates to the zinc fluoride incorporated phosphor for infrared-to-visible conversion comprising as a host material yttrium fluoride, lanthanum fluoride or lutetium fluoride and as a sensitizer ytterbium, and as an activator erbium and/or holmium, whereby the luminescence brightness is extremely heightened.

The primary object of this invention is to provide phosphors for infrared-to-visible conversion having high efficiency and giving high luminescence brightness, which can be effectively applied to optical devices such as display devices.

Another object of this invention is to modify substantially the electronic process in solid in the excitation-to-emission mechanism in the phosphor comprising as the host material yttrium fluoride, lanthanum fluoride or lutetium fluoride and as the sensitizer ytterbium, and as the activator erbium and/or holmium by incorporating zinc fluoride therein and to improve the luminescence efficiency extremely.

We have found that when a specific additive is added in the preparation of phosphors comprising as the host material yttrium fluoride, lanthanum fluoride or lutetium fluoride, as the acitvator erbium and/or holmium and as the sensitizer ytterbium, and zinc fluoride is incorporated in the resulting phosphors, the brightness of the resulting zinc fluoride incorporated phosphors is extremely heightened.

More specifically, when zinc fluoride or zinc silicofluoride is further added as the specific additive to the composition comprising the above-mentioned rare earth fluoride, the brightness of the resulting zinc fluoride incorporated phosphors is much higher than that of zinc fluoride-free phosphors. For instance, in the phosphor containing yttrium fluoride as the host material, the brightness is heightened by 5–10 times due to addition of such specific additive, and in the case of the lanthanum fluoride or lutetium fluoride as the host material, the brightness is increased by 2-7 times due to the addition. Accordingly, it has now become possible to provide the phosphors for infrared-to-visible conversion which are of great practical value.

Figure 2:
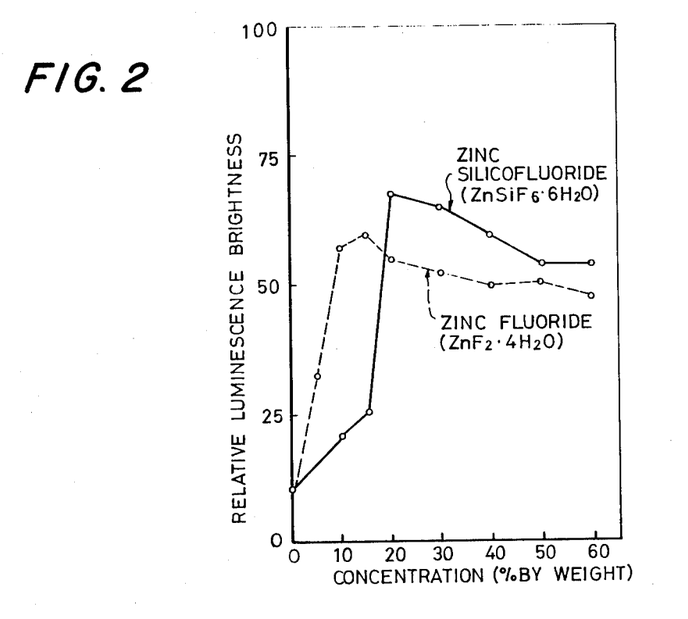
Figure 3:
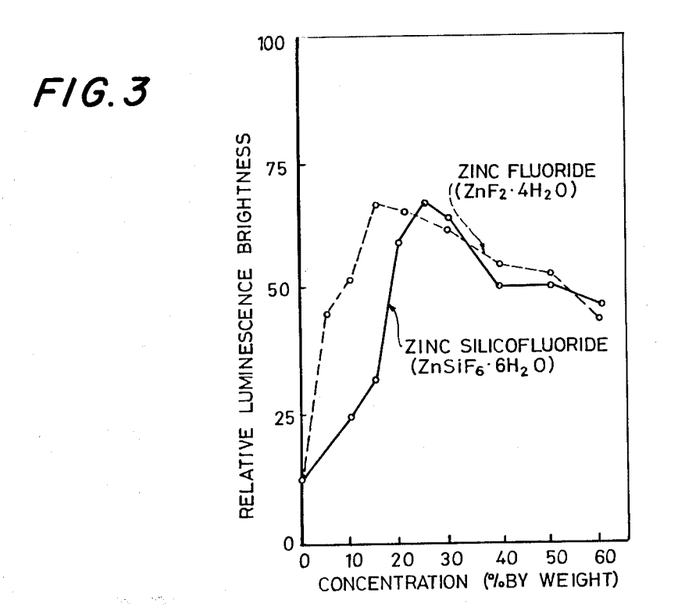
Figure 4:
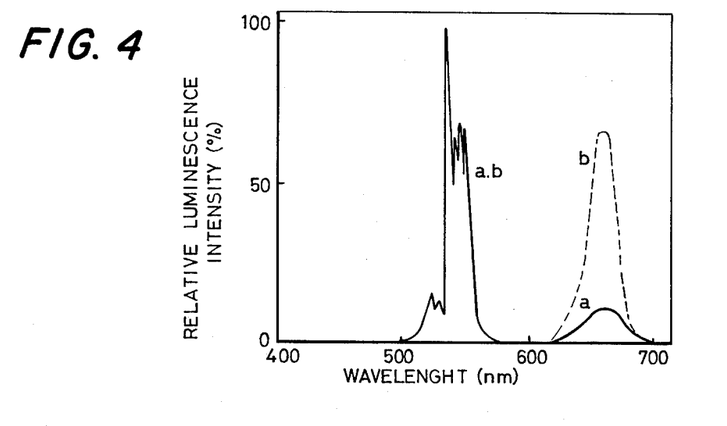
FIGS. 4 to 6 illustrate the effects of this invention in terms of emission spectra under excitation of infrared radiation with respect to the phosphors comprising as the host material yttrium fluoride, lanthanum fluroide or lutetium fluoride. The curve $a$ illustrates the emission spectrum of the phosphor incorporated with zinc fluoride according to the invention, and the curve $b$ illustrates the emission spectrum of the phosphor free of zinc fluoride, each curve being normalized based on the peak in the green region.
Figure 5:
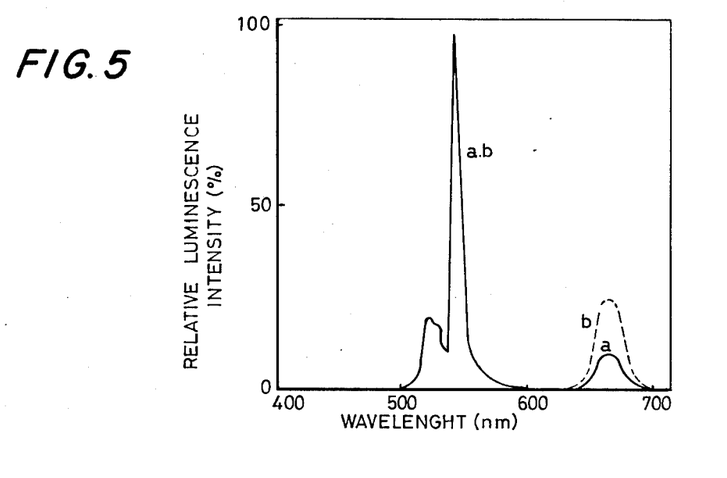
Figure 6:
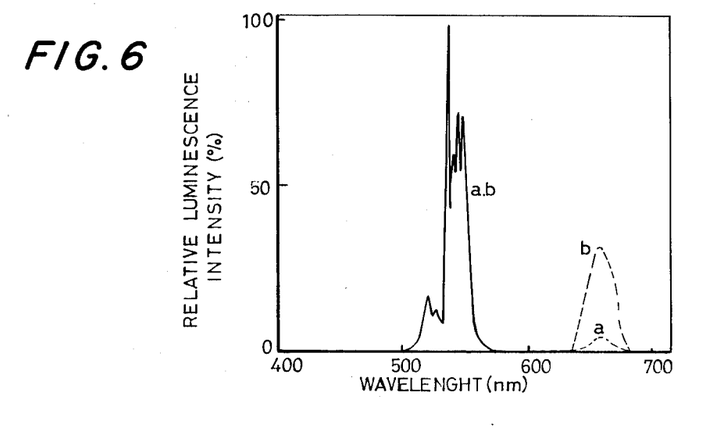

Such conspicuous increase of the brightness by addition of the above specific additive is shown in FIGS. 1 to 3, and FIGS. 4 to 6, respectively, illustrating the change of the emission spectrum in the phosphor of this invention which is brought by the incorporation of zinc fluoride. As is apparent from comparison of the curve $a$ (phosphor of this invention) with the curve $b$ in each of FIGS. 4 to 6, the luminescence in the red region is extremely lowered but in the green region is heightened in the zinc fluoride incorporated phosphor. (FIGS. 4 to 6 are depicted by normalizing the curves based on the maximum peak in the green region, and thus comparison of absolute values may readily be made by referring to FIGS. 1 to 3).

The reasons for such conspicuous improvements of the luminescence brightness by the above-mentioned two specific additives have not been completely elucidated, but it is apparent that the first reason resides in an improvement of the luminescence mechanism in that the zinc fluoride incorporated in the phosphor restrains a conversion rate of absorbed infrared light to the luminescence in the red region which is most disadvantageous as the visibility factor, and increases a conversion rate to the luminescence in the green region which is of the highest luminous efficiency. Incidentally, according to ICI (International Commission on Illumination), the ratio of the luminous efficiency of the green light of 540nm to that of the red light of 670 nm is 0.954 to 0.032.

Further, it is understood that in the phosphors exhibiting infrared-to-visible conversion of this type, the excitation states for luminescence are brought about by excitation processes of two or more stages. Accordingly, it may be understood that, by means of incorporation of zinc fluoride, the life time of the first excitation state and of the accompanying intermediate state caused by infrared light can be made longer and subsequently the probability of the second excitation stage may be heightened, whereby the luminescence efficiency can be improved.

Figure 7A:
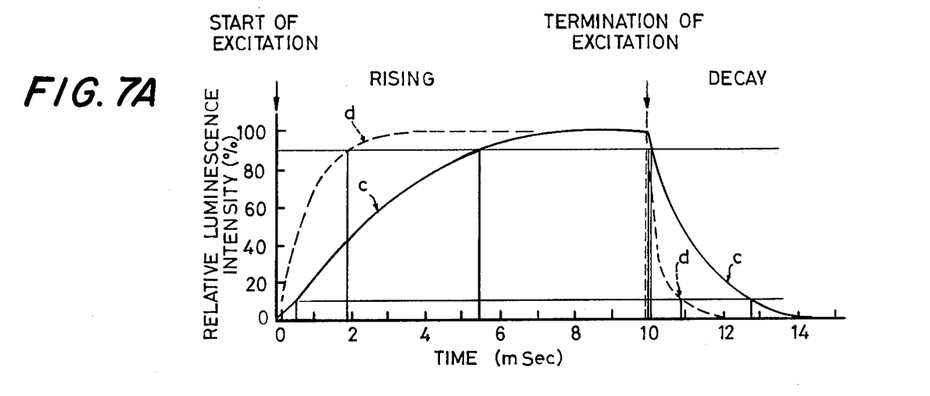
Figure 7B:
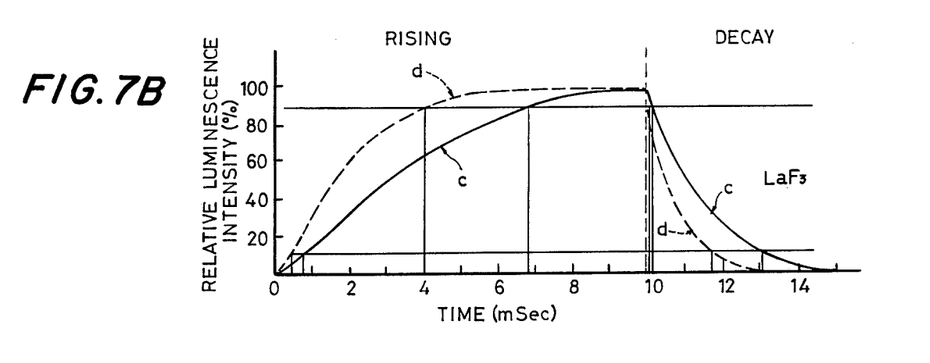
Figure 7C:
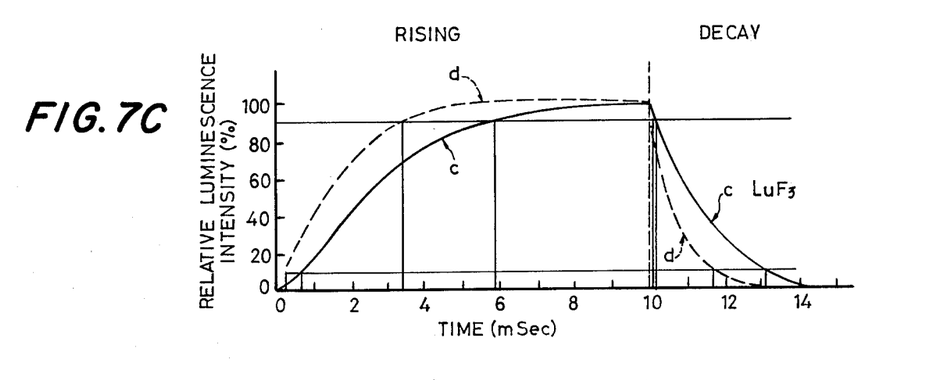

FIGS. 7-A, 7-B and 7-C showing the time response characteristics support the above understanding. More specifically, as is apparent from a comparison of curve $c$ (the zinc fluoride incorporated phosphor of the present invention) with curve $d$, retardation of the rising and the decay time is understood corresponding to the above-mentioned increase of the life time during the excitation process.

The above prominent differences seen in the emission spectra and the time response characteristics prove that the zinc fluoride incorporated phosphors of this invention are novel phosphors which can be distinguished substantially from known rare earth fluoride phosphors of a similar composition except for zinc fluoride with respect to the excitation-to-emission mechanism.

The second reason is presumed to be that incorporation of zinc fluoride improves the particle property of phosphor crystals so that, when the phosphor of this invention is excited by infrared light, scattering of incident infrared light may be prevented, whereby it may be absorbed efficiently.

The third reason is construed to be that the specific additives of this invention, like ordinary additives called "fluxes", perform the functions of stabilizing a preparation of the phosphors and removing and extracting unnecessary impurities by substitution or the like.

Figure 1:
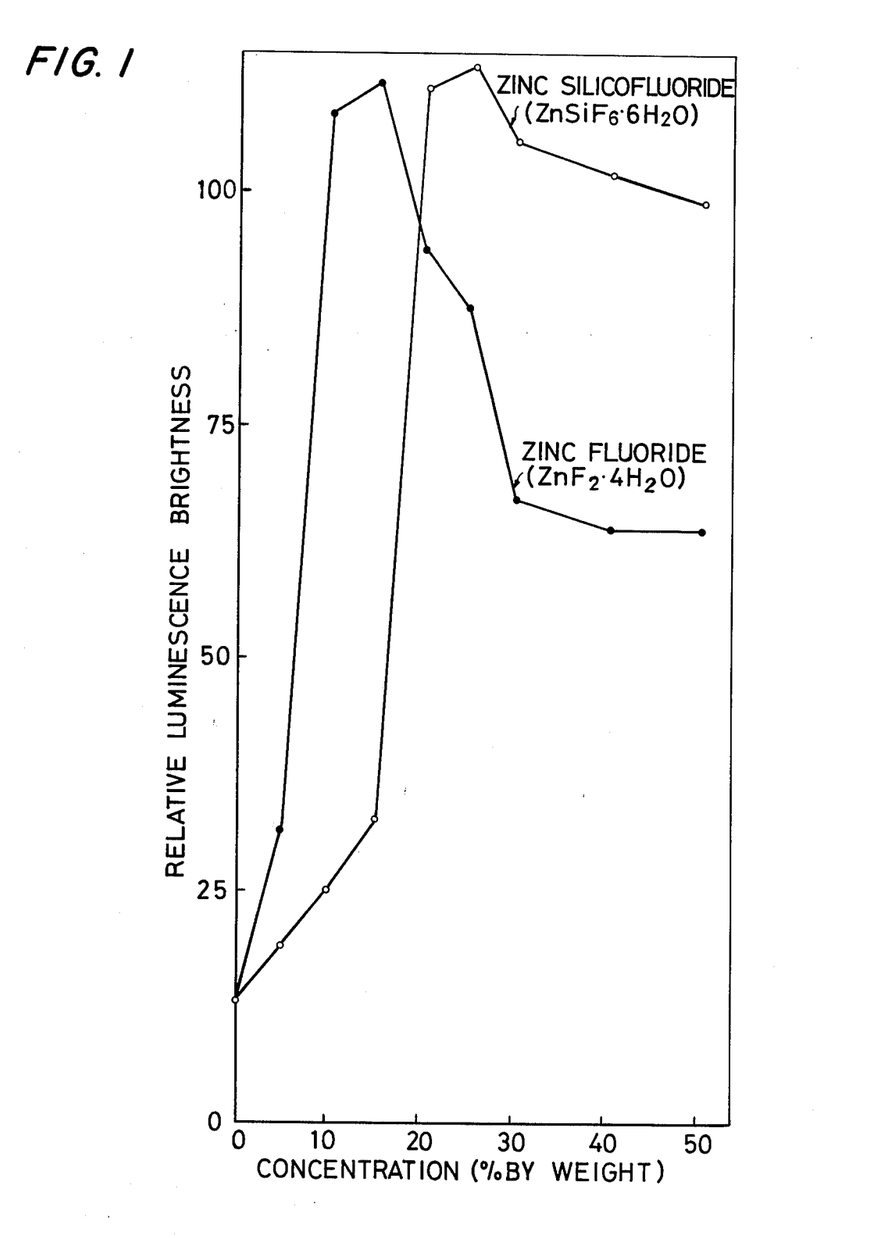
FIGS. 1 and 3 illustrate the relation between the luminescence brightness under excitation of infrared radiation and the amount of zinc fluoride or zinc silicofluoride added in the preparation of zinc fluoride incorporated phosphors for infrared-to-visible conversion comprising as the host material yttrium fluoride, lanthanum fluoride or lutetium fluoride, as the sensitizer ytterbium and as the activator erbium.

Since the improvement in the brightness shown in FIGS. 1 to 3 is so conspicuous as not seen in conventional phosphors, it is deemed that not only the above-mentioned effects on the luminescence mechanism but also various complex synergistic effects contribute in the attainment of such unexpected phenomena. In short, the effects by incorporation of zinc fluoride are unexpected and unobvious over the effects by conventional fluxes and other additives customarily included in the preparation of phosphors.

The phosphors of this invention may be synthesized, for instance, by the following methods.

Yttrium fluoride, lanthanum fluoride and lutetium fluoride to be used as the host materials may be formed conveniently by utilizing the reaction in solutions.

More specifically, an aqueous solution of a water-soluble compound of yttrium, lanthanum or lutetium, or an acid or alkali solution of a compound of yttrium, lanthanum or lutetium is heated on a water bath, and excess of a hydrofluoric acid solution is poured thereinto, or hydrogen fluoride gas is blown into such aqueous, acid or alkali solution, whereby precipitates of yttrium fluoride, lanthanum fluoride or lutetium fluoride are formed. Then, the precipitate is recovered in the hydrous form of yttrium fluoride, lanthanum fluoride or lutetium fluoride by suction filtration of the precipitate or evaporation of the solution. Then, such hydrous fluoride is heated at a relatively low temperature such as about 300° C. in vacuum or in a neutral atmosphere so as to obtain the anhydrous form of yttrium fluoride, lanthanum fluoride or lutetium fluoride, which can be used as the host material.

In this invention, it is essential to add to the above host material rare earth fluorides such as ytterbium fluoride and erbium fluoride as sensitizer and activator which may be prepared in the same manner as the above host material and at least one member selected from zinc fluoride and zinc silicofluoride.

As the method for blending the rare earth fluorides as activator or sensitizer in desired amounts to the host material of yttrium fluoride, lanthanum fluoride or lutetium fluoride, there have been known the following two methods.

One of them comprises adding necessary amounts of rare earth fluorides prepared in the same manner as mentioned with respect to yttrium fluoride, lanthanum fluoride and lutetium fluoride, to the host material fluoride, and mixing them mechanically.

The other method comprises utilizing similarity of chemical properties between these additive fluorides and the host material fluoride namely coprecipitating rare earth fluorides to be used as additives, with yttrium fluoride, lanthanum fluoride or lutetium fluoride to be used as the host material.

The former method attains the blending merely by the physical or mechanical blending of rare earth fluorides, and therefore, in this method it is necessary to conduct milling and mixing sufficiently.

In the latter method, they are uniformly blended and do not require any additional operation for blending, since there occurs a coprecipitation of rare earth fluorides with the host material.

Either of these known blending methods may be adopted in the preparation of phosphors of this invention.

In short, the zinc compounds may be added to a mixture of rare earth fluorides or to a coprecipitated mixture of rare earth fluorides. For instance, the zinc compounds can be sufficiently blended with rare earth fluorides by means of a mixing means such as a mortar or a ball mill, and thus a pulverization of the starting mixture can be attained in the same time.

It is also possible to adopt a method comprising subjecting a mixture of rare earth fluorides free of zinc fluoride to the heat treatment which will be described below, and then adding the zinc compound into the heat-treated mixture, whereby blending them sufficiently.

The amounts of zinc fluoride or zinc silicofluoride will now be described. In the case of zinc fluoride, good results are obtained when it is added in an amount of at least 2% by weight based on the total weight of the rare earth fluorides, and the amount ranging from 10 to 15% by weight is preferably recommended.

In the case of zinc silicofluoride, good results are obtained when it is added in an amount of at least 10% by weight based on the total weight of rare earth fluorides, and the amount ranging from 20 to 30% by weight is preferable.

The starting mixture is sufficiently and uniformly blended, and then it is subjected to heat treatment. In this heat treatment, the starting mixture is charged into a heat-resistant, lidded vessel such as an alumina crucible or a platinum crucible, and is heated in a neutral atmosphere such as nitrogen or argon or in an atmosphere of anhydrous hydrogen fluoride.

The heating temperature is within a range of from 800° to 1,200° C. in the case of lanthanum fluoride, and within a range of from 800° to 1,100° C. in the case of yttrium fluoride or lutetium fluoride.

It is appropriate to conduct the heating for 30 minutes to 5 hours. It is preferred to carry out the heat treatment for 1-3 hours at about 1,050° C. in the case of the former host material and at about 1,000° C. in the case of the latter host material.

It is chemically well-known that zinc silicofluoride decomposes into zinc fluoride ($ZnF_2$) and silicon fluoride ($SiF_4$) on heating. Thus, the zinc silicofluoride added as a starting material in the present invention also decomposes into the above two compounds, and silicon fluoride runs away from the system.

Better results are obtained when the gradual cooling is conducted after completion of the above heat treatment.

The luminescence brightness can be further improved by slightly pulverizing the resulting phosphors and washing them with an acid such as nitric acid or hydrochloric acid.

In some cases, the growth of particles and improvement of the luminescence brightness can be attained by adding to the washed product the zinc compounds or other well-known flux in a similar manner which is described above, and further repeating the heat treatment.

Alternatively, excellent phosphors for infrared-to-visible conversion can be obtained from known phosphors having a similar composition but free of zinc fluoride. More specifically, a known phosphor for infrared-to-visible conversion being free of zinc fluoride is used as the starting material, and zinc fluoride and/or zinc silicofluoride is added thereto followed by such heating and preparation procedures as described above.

As is well known, the phosphors have quite a high structure-sensitiveness. The effects of the specific additives discovered by us are attained by utilizing most effectively this high structure-sensitiveness. Accordingly, in the preparation of the phosphors, care must be taken for conducting the above operational procedures under the above-mentioned conditions.

The present invention has been given hereinbefore by referring mainly to the case where erbium is used as the activator, but it must be noted that the above explanation can apply similarly to the case where holmium is used as the activator.

The resulting phosphor has a composition expressed by one of the following formulas:

$$(Y_{1-x-y}Yb_xA_y) F_3 \cdot \alpha ZnF_2$$

$$(La_{1-x-y}Yb_xA_y) F_3 \cdot \alpha ZnF_2 \text{ and}$$

$$(Lu_{1-x-y}Yb_xA_y) F_3 \cdot \alpha ZnF_2$$

wherein A is at least one member selected from erbium and holmium.

The amount $x$ of ytterbium is, expressed in the gram atomic ratio, from 0.05 to 0.5.

The amount $y$ of erbium and/or holmium is, expressed in the gram atomic ratio, from 0.002 to 0.09 when yttrium fluoride is used as the host material, and from 0.001 to 0.1 when lanthanum or lutetium fluoride is used as the host material.

When the amounts of ytterbium, and erbium and/or holmium are within the above ranges, there can be obtained phosphors having high efficiency of infrared-to-visible conversion and high luminescence brightness. Best results are obtained when the value of $x$ is within a range of from 0.1 to 0.3, and the value of $y$ is within a range of from 0.01 to 0.04.

$\alpha$ is in the range of from $1.6 \times 10^{-4}$ to $1.6 \times 10^{-3}$ gram per 1 gram of the phosphor.

In some cases, the phosphors of this invention obtained by the above-mentioned process cannot be distinguished by X-ray diffraction from analogous well-known phosphors, but the presence of zinc fluoride can be confirmed by a spectroscopic analyzer or an electron micro-probe X-ray analyzer. We have quantitatively analyzed the amount of zinc incorporated in the phosphor by comparing the X-ray output of zinc incorporated in the phosphor with the X-ray output of pure metal zinc using electron micro-probe X-ray analyzer, and found that the amount of zinc fluoride incorporated in the phosphor is independent of the amount of zinc fluoride or zinc silicofluoride added and is in the range of from $1.6 \times 10^{-4}$ to $1.6 \times 10^{-3}$ gram per 1 gram of the phosphor. Further, as is seen from FIGS. 4 to 7, the incorporation of zinc fluoride results in reduction of the red emission under excitation of infrared radiation and in an increase of the green emission.

It is also evident that the time response is greatly retarded by the incorporation of zinc fluoride. Thus, the prominent effects of this invention can be proved by data shown in these Figures.

This invention will now be detailed by the following examples. Preferred methods for the synthesis of phosphors of this invention are illustrated in Examples 1 and 9.

EXAMPLE 1

A mixture of the following rare earth oxides;

yttrium oxide ($Y_2O_3$)—0.79 mole
ytterbium oxide ($Yb_2O_3$)—0.19 mole
erbium oxide ($Er_2O_3$)—0.02 mole was dissolved in nitric acid of an amount slightly exceedng the stoichiometric amount, and pure water was added to the solution until the volume of the resulting aqueous solution was about 2 times as large as that of the starting nitric acid solution. Excess hydrofluoric acid was poured into the aqueous solution and the solution was heated with stirring for about 3 hours to form a gelatinous coprecipitate mixture of rare earth fluorides in the solution. The coprecipitated-mixture containing solution was allowed to stand still overnight, and the mixture of hydrous rare earth fluorides was separated by suction filtration and dried in a drier to remove absorbed water. Then, the dried coprecipitated mixture was heated at about 300° C. for about 1 hour in a nitrogen atmosphere to remove water of crystallization therefrom. To the thus obtained mixture of anhydrous rare earth fluorides, 0.28 mole of zinc fluoride ($ZnF_2.4H_2O$) was added and they were well blended by employing a mortar. Then, the blend was charged into an alumina crucible and was heated at 1,000° C. for 2 hours in high purity nitrogen atmosphere in an electric furnace. Thus there was obtained a phosphor expressed by the formula $(Y_{0.79}.Yb_{0.19}.Er_{0.02}) — F_3.0.0011\ ZnF_2$ for infrared-to-visible conversion which emitted at a high efficiency under excitation of infrared radiation and exhibited the emission spectrum shown in curve $a$ of FIG. 4.

EXAMPLE 2

To the anhydrous rare earth fluoride mixture obtained in the same manner as in Example 1, 0.26 mole of zinc silicofluoride ($ZnSiF_6.6H_2O$) was added, and they were well blended by employing a mixer mill and charged into an alumina crucible. Then, the blend was heated at 1,000° C. for 1.5 hours in a current of nitrogen in an electric furnace to obtain a phosphor expressed by the formula $(Y_{0.79}.Yb_{0.19}.Er_{0.02})F_3.0.0010\ ZnF_2$ for infrared-to-visible conversion which emitted at a high efficiency under excitation of infrared radiation and exhibited the emission spectrum shown in curve $a$ of FIG. 4.

EXAMPLE 3

Anhydrous rare earth fluorides formed by optional known methods were blended to obtain the following mixture:
yttrium fluoride ($XF_3$)—0.78 mole
ytterbium fluoride ($YbF_3$)—0.19 mole
erbium fluoride ($ErF_3$)—0.03 mole Then, 0.14 mole of zinc fluoride ($ZnF_2.4H_2O$) was added to the mixture and sufficiently milled and mixed by means of a ball mill. The mixture was charged into an alumina crucible and heated at 1000° C. for 2 hours in a current of nitrogen in an electric furnace. Thus there was obtained a phosphor expressed by the formula $(Y_{0.78}.Yb_{0.19}.Er_{0.03})F_3.0.0005\ ZnF_2$ for infrared-to-visible conversion which emitted at a high efficiency under excitation of infrared radiation and exhibited the emission spectrum shown in curve $a$ of FIG. 4.

EXAMPLE 4

Anhydrous rare earth fluorides prepared by optional known processes were blended to form the following mixture:
yttrium fluoride ($YF_3$)—0.79 mole
ytterbium fluoride ($YbF_3$)—0.19 mole
erbium fluoride ($ErF_3$)—0.02 mole Then, 0.13 mole of zinc silicofluoride ($ZnSiF_6.6H_2O$) was added to the mixture and sufficiently blended thereinto by employing a mixer mill. The resulting blend was charged into an alumina crucible and heated at 1,000° C for 2.5 hours in a high purity nitrogen atmosphere in an electric furnace. Thus, there was obtained a phosphor expressed by the formula $(Y_{0.79}.Yb_{0.19}.Er_{0.02})F_3.0.0005\ ZnF_2$ for infrared-to-visible conversion which emitted at a high efficiency under excitation of infrared radiation and exhibited the emission spectrum shown in curve $a$ of FIG. 4.

EXAMPLE 5

To one mole of a mixture of anhydrous rare earth fluorides obtained by optional known methods, having a composition $(Y_{0.79}.Yb_{0.19}.Er_{0.02})F_3$ 0.15 mole of zinc fluoride ($ZnF_2.4H_2O$) was added, and they were well blended by employing a ball mill. The blend was charged into a platinum crucible and heated at 1,050° C. for 2 hours in a high purity nitrogen atmosphere in an electric furnace to obtain a phosphor expressed by the formula $(Y_{0.79}.Yb_{0.19}.Er_{0.02})F_3.0.0005\ ZnF_2$ for infrared-to-visible conversion which emitted at a high efficiency and exhibited the emission spectrum shown in curve $a$ of FIG. 4.

EXAMPLE 6

Anhydrous rare earth fluorides obtained by optional known methods were mixed to form the following mixture:
yttrium fluoride ($YF_3$)—0.79 mole
ytterbium fluoride ($YbF_3$)—0.19 mole
erbium fluoride ($ErF_3$)—0.02 mole and further 0.12 mole of zinc fluoride ($ZnF_2.4H_2O$) was added to the mixture. The mixture was well blended by means of a mortar and charged into a platinum crucible, and then heated at 950° C. for 2 hours in a current of hydrogen fluoride in an electric furnace. Thus there was obtained a phosphor expressed by the formula $(Y_{0.79}.Yb_{0.19}.Er_{0.02})F_3.0.0003\ ZnF_2$ for infrared-to-visible conversion which emitted at a high efficiency under excitation of infrared radiation and exhibited the emission spectrum shown in curve $a$ of FIG. 4.

EXAMPLE 7

To one mole of a mixture of rare earth fluorides prepared by optional known methods, having a composition $(Y_{0.80}.Yb_{0.185}.Er_{0.015})F_3$ 0.15 mole of zinc silicofluoride ($ZnSiF_6.6H_2O$), was added and they were well blended by means of a mortar, charged into a platinum crucible and heated at 950° C. for 2 hours in a current of argon in an electric furnace to obtain a phosphor expresse by the formula $(Y_{0.80}.Yb_{0.185}.Er_{0.015})F_3.0.0002\ ZnF_2$ for infrared-to-visible conversion which emitted at a high efficiency under excitation of infrared radiation and exhibited the emission spectrum shown in curve $a$ of FIG. 4.

EXAMPLE 8

Anhydrous rare earth fluorides prepared by optional known methods were mixed to form the following mixture:
yttrium fluoride ($YF_3$)—0.795 mole
ytterium fluoride ($YbF_3$)—0.19 mole
holmium fluoride ($HoF_3$)—0.015 mole and further 0.12 mole of zinc fluoride ($ZnF_2.4H_2O$) was added to the mixture. They were well blended by means of a ball mill, charged into an alumina crucible, and heated at 1,000° C. in a current of pure nitrogen for 2 hours in an electric furnace to obtain a phosphor expressed by the formula $(Y_{0.795}.Yb_{0.19}.Ho_{0.015})F_3.0.0003\ ZnF_2$ for infrared-to-visible conversion which emitted at a high efficiency under excitation of infrared radiation and exhibited the emission spectrum shown in curve $a$ of FIG. 4.

EXAMPLE 9

A mixture of the following rare earth oxides:
lanthanum oxide ($La_2O_3$)—0.83 mole
ytterbium oxide ($Yb_2O_3$)—0.13 mole
erbium oxide ($Er_2O_3$)—0.03 mole
was dissolved in nitric acid in an amount slightly exceeding the stoichiometric amount, and pure water was added to the solution until the volume of the resulting aqueous solution was about 2 times as large as that of the starting nitric acid solution. Excess hydrofluoric acid was poured into the aqueous solution and the solution was heated with stirring for about 3 hours to obtain a gelatinous coprecipitated mixture of rare earth fluorides in the solution. The coprecipitated mixture-containing solution was allowed to stand still overnight, and hydrous rare earth fluoride hydrates were separated by suction filtration and dried at about 300° C. for about 1 hour in a nitrogen atmosphere to remove absorbed water therefrom. Then, to the resulting mixture of anhydrous rare earth fluorides 0.28 mole of zinc fluoride ($ZnF_2.4H_2O$) was added and well blended therewith by employing a mortar. The blend was charged into an alumina crucible and heated at 1,050° C. for 2 hours in a high purity nitrogen atmosphere, followed by washing with the same amount of nitric acid as that of the product. Thus there was obtained a phosphor expressed by the formula $(La_{0.83}.Yb_{0.14}.Er_{0.03})F_3.0.0013\ ZnF_2$ for infrared-to-visible conversion which emitted at a high efficiency under excitation of infrared radiation and exhibited the emission spectrum shown in curve $a$ of FIG. 5

EXAMPLE 10

To one mole of a mixture of anhydrous rare earth fluorides prepared in the same manner as in Example 9 0.26 mole of zinc silicofluoride ($ZnSiF_6.6H_2O$) was added, and they were well mixed by employing a mixer mill. The resulting blend was charged in an alumina crucible and heated at 1,050° C. for 1.5 hours in a current of nitrogen in an electric furnace. Thus there was obtained a phosphor expressed by the formula $(La_{0.83}.Yb_{0.1}.Er_{0.03})F_3.0.0014\ ZnF_2$ for infrared-to-visible conversion which emitted at a high efficiency under excitation of infrared radiation and exhibited the emission spectrum shown in curve $a$ of FIG. 5.

EXAMPLE 11

Anhydrous rare earth fluorides prepared by an optional known method or the above-described method were blended to form the following mixture:
lanthanum fluoride ($LaF_3$)—0.86 mole
ytterbium fluoride ($YbF_3$)—0.12 mole
erbium fluoride ($ErF_3$)—0.02 mole
and further 0.14 mole of anhydrous zinc fluoride ($ZnF_2$) was added to the mixture. The mixture was well blended by means of a ball mill, charged into an alumina crucible and heated at 1050° C. for 2 hours in a current of nitrogen in an electric furnace. Thus there was obtained a phosphor expressed by the formula $(La_{0.86}.Yb_{0.12}.Er_{0.02})F_3.0.0008\ ZnF_2$ for infrared-to-visible conversion which emitted at a high efficiency under excitation of infrared radiation and exhibited the emission spectrum shown in curve $a$ of FIG. 5.

EXAMPLE 12

Anhydrous rare earth fluorides prepared by an optional known method or the above-mentioned method were blended to form the following mixture:
lanthanum fluoride ($LaF_3$)—0.86 mole
ytterbium fluoride ($YbF_3$)—0.12 mole
erbium fluoride ($ErF_3$)—0.02 mole
and further 0.26 mole of zinc silicofluoride ($ZnSiF_6.6H_2O$) were added to the mixture. The resulting mixture was well blended by means of a mixer mill, charged into a platinum crucible and heated at 1000° C. for 2.5 hours in an anhydrous hydrogen fluoride atmosphere in an electric furnace to obtain a phosphor expressed by the formula $(La_{0.86}.Yb_{0.12}.Er_{0.02})F_3.0.0016\ ZnF_2$ for infrared-to-visible conversion which emitted at a high efficiency under excitation of infrared radiation and exhibited the emission spectrum shown in curve $a$ of FIG. 5.

EXAMPLE 13

Anhydrous rare earth fluorides obtained by an optional known method or the above-mentioned method were blended to form the following mixture:
lanthanum fluoride ($LaF_3$)—0.86 mole
ytterbium fluoride ($YbF_3$)—0.12 mole
holmium fluoride ($HoF_3$)—0.02 mole
and further 0.14 mole of zinc fluoride ($ZnF_2.4H_2O$) was added to the mixture. The resulting mixture was well blended by employing a ball mill, charged into an alumina crucible and heated at 1000° C. for 2 hours in a current of pure nitrogen in an electric furnace to obtain a phosphor expressed by the formula $(La_{0.86}.Yb_{0.12}.Ho_{0.02})F_3.0.0005\ ZnF_2$ for infrared-to-visible conversion exhibiting a green emission of a high brightness under excitation of infrared radiation.

EXAMPLE 14

Anhydrous rare earth fluorides prepared by an optional known method or the above-mentioned method were blended to form the following mixture:
lutetium fluoride ($LuF_3$)—0.79 mole
ytterbium fluoride ($YbF_3$)—0.19 mole
erbium fluoride ($ErF_3$)—0.02 mole
and further 0.14 mole of zinc fluoride ($ZnF_2.4H_2O$) were added to the mixture. The resulting mixture was well blended by means of a ball mill, charged into an alumina crucible and heated at 1000° C. for 2 hours in a current of pure argon in an electric furnace to obtain a phosphor expressed by the formula $(Lu_{0.79}.Yb_{0.19}.Er_{0.02})F_3.0.0008\ ZnF_2$ for infrared-to-visible conversion which emitted at a high efficiency under excitation of infrared radiation and exhibited the emission spectrum shown in curve $a$ of FIG. 6.

EXAMPLE 15

To one mole of anhydrous complex rare earth fluorides obtained by an optional known method or the above-mentioned method, having a composition $(La_{0.80}.Yb_{0.185}.Er_{0.015})F_3$, 0.26 of zinc silicoflouride ($ZnSiF_5.6H_2O$) was added, and they were well blended by employing a mortar. The resulting mixture was charged into an alumina crucible and heated at 1000° C. for 2 hours in a current of pure nitrogen in an electric furnace, followed by addition of nitric acid of the same amount as that of the product. Thus there was obtained a phosphc expressed by the formula $(La_{0.80} \cdot Yb_{0.185} \cdot Er_{0.015})F_3 \cdot 0.0010 \; ZnF_2$ for infrared-to-visible conversion which emitted at a high efficiency under excitation of infrared radiation and exhibited the emission spectrum shown in curve $a$ of FIG. 5.

EXAMPLE 16

Anhydrous rare earth fluorides prepared by an optional known method or the above-mentioned method were blended to form the following mixture:

lutetium fluoride ($LuF_3$) — 0.795 mole
ytterbium fluoride ($YbF_3$) — 0.19 mole
holmium fluoride ($HoF_3$) — 0.015 mole and further 0.14 mole of anhydrous zinc fluoride ($AnF_2$) was added to the mixture. The resulting mixture was well blended by employing a ball mill, charged into an alumina crusible and heated at 1,000° C. for 2 hours in a current of pure nitrogen in an electric furnace to obtain a phosphor expressed by the formula $(Lu_{0.795} \cdot Yb_{0.19} \cdot Ho_{0.015})F_3 \cdot 0.0003 \; ZnF_2$ for infrared-to-visible conversion which exhibited a green emission of a high brightness under excitation of infrared radiation.

EXAMPLE 17

To one mole of anhydrous complex rare earth fluorides prepared by an optional known method or the above-mentioned method, having a composition expressed by the formula $(Lu_{0.79} \cdot Yb_{0.19} \cdot Er_{0.02})F_3$ 0.3 mole of zinc silicofluoride ($ZnSiF_6 \cdot 6H_2O$) was added. The resulting mixture was well blended by employing a morar, charged into a platinum crucible and heated at 1,000° C. for 2 hours in a current of anhydrous hydrogen fluoride followed by washing with hydrochloric acid of the same amount as that of the product. Thus there was obtained a phosphor expressed by the formula $(Lu_{0.79} \cdot Yb_{0.19} \cdot Er_{0.02})F_3 \cdot 0.0006 \; ZnF_2$ for infrared-to-visible conversion which emitted at a high efficiency under excitation of infrared radiation and exhibited the emission spectrum shown in curve $a$ of FIG. 6.

We claim:

1. A zinc-incorporated phosphor for infrared-to-visible conversion, prepared by the process which comprises adding zinc fluoride in an amount of at least 2% by weight or zinc silicofluoride in an amount of at least 10% by weight based on the total weight of the anhydrous rare earth fluorides shown by the general composition hereafter, prior to or after formation of the main ingredient of the phosphor consisting essentially of a complex rare earth fluoride having a general composition expressed by one of the following formulae $(Y_{1-x-y}Yb_xA_y) F_3$, $(La_{1-x-y}Yb_xA_y) F_3$ and $(Lu_{1-x-y}Yb_xA_y) F_3$, wherein $x$ is in the range of from 0.05 to 0.5, $y$ is in the range from 0.002 to 0.09 when yttrium fluoride is the host material and from 0.001 to 0.1 when lanthanum or lutetium fluoride is the host material, and A is at least one member selected from Er and Ho, and subsequent heating at a temperature ranging from 800° to 1,200° C when lanthanum fluoride is the host material and from 800° to 1100° C, when yttrium fluoride or lutetium fluoride is the host material for a time of 30 minutes to 5 hours in a neutral or anhydrous hydrogen fluoride atmosphere.

2. The phosphor of claim 1, wherein $x$ is in the range of from 0.1 to 0.3 and $y$ is in the range of from 0.1 to 0.04.

3. The phosphor of claim 1, wherein the host material is yttrium, fluoride A is Er, $x$ is 0.19 and $y$ is 0.02 or 0.03.

4. The phosphor of claim 1, wherein the host material is yttrium fluoride or lanthanum fluoride A is Er, $x$ is 0.185 and $y$ is 0.015.

5. The phosphor of claim 1, wherein the host material is lanthanum fluoride, A is Er or Ho, $x$ is 0.12 and $y$ is 0.02.

6. The phosphor of claim 1, wherein the host material is lanthanum fluoride, A is Er, $x$ is 0.14 and $y$ is 0.03.

7. The phosphor of claim 1, wherein the host material is lutetium fluoride, A is Er, $x$ is 0.19 and $y$ is 0.02.

8. The phosphor of claim 1, wherein the host material is yttrium fluoride or lutetium fluoride, A is Ho, $x$ is 0.19 and $y = 0.015$.

* * * * *